(12) United States Patent
Simons et al.

(10) Patent No.: US 7,630,611 B2
(45) Date of Patent: Dec. 8, 2009

(54) OPTICAL FIBER AND METHOD OF MANUFACTURING AN OPTICAL FIBER

(75) Inventors: Dennis R. Simons, Eindhoven (NL); Henrikus L. M. Jansen, Bergeyk (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 11/759,662

(22) Filed: Jun. 7, 2007

(65) Prior Publication Data

US 2008/0031581 A1  Feb. 7, 2008

Related U.S. Application Data

(62) Division of application No. 10/165,620, filed on Jun. 7, 2002, now abandoned.

(30) Foreign Application Priority Data

Jun. 8, 2001  (NL) .................................... 1018239

(51) Int. Cl.
*G02B 6/00*  (2006.01)
(52) U.S. Cl. ...................... 385/142; 385/123
(58) Field of Classification Search ........................ None
See application file for complete search history.

(56) References Cited

U.S. PATENT DOCUMENTS

| | | | |
|---|---|---|---|
| 4,334,903 A | 6/1982 | MacChesney et al. | |
| 4,388,095 A | 6/1983 | Schneider et al. | |
| 4,664,689 A | 5/1987 | Davis | |
| 5,242,476 A | 9/1993 | Bartel et al. | |
| 5,320,658 A | 6/1994 | Ohga et al. | |
| 5,790,736 A * | 8/1998 | Fabian ........................ | 385/128 |
| 5,838,866 A | 11/1998 | Antos et al. | |
| 5,979,190 A | 11/1999 | Fleming, Jr. et al. | |
| 6,050,108 A | 4/2000 | Ishihara et al. | |
| 6,105,396 A | 8/2000 | Glodis et al. | |
| 6,131,416 A | 10/2000 | Kuck et al. | |
| 6,705,115 B2 | 3/2004 | Matsuo et al. | |
| 2003/0056549 A1* | 3/2003 | de Sandro et al. ............. | 65/420 |
| 2008/0285929 A1* | 11/2008 | Shimotakahara ............ | 385/127 |

FOREIGN PATENT DOCUMENTS

| | | | |
|---|---|---|---|
| EP | 0 127 227 A2 | | 12/1984 |
| EP | 181595 A2 * | | 5/1986 |
| JP | 54 151623 | | 11/1979 |
| JP | 61-191544 A * | | 8/1986 |
| JP | 62-83333 A * | | 4/1987 |
| JP | 406056457 A | | 3/1994 |

OTHER PUBLICATIONS

Christian and Pasauer, "Fiber Optic Component Design, Fabrication, Testing, Operation, Reliability and Maintainability", William Andrew Publishing/Noyes, 1989, pp. 84-85.
Geittner et al., "PCVD at High Deposition Rates", J Lightwave Technology LT4(7):818-822, Jul. 1986.
Hewak, "Properties, Processing and Applications of Glass and Rare Earth-Doped Glasses for Optical Fibres", Short Run Press Ltd., Exeter, England 1998, p. 56.
Kingery et al., "Introduction to Ceramics, 2d Ed.", John Wiley & Sons, New York, 1976, p. 648.
Waynant and Ediger, "Electro-Optics Handbook (2d Ed.)", McGraw-Hill, 2000, pp. 12.12-12.16.

* cited by examiner

*Primary Examiner*—Mike Stahl
(74) *Attorney, Agent, or Firm*—Seed IP Law Group PLLC

(57) ABSTRACT

The present invention relates to a method of manufacturing an optical fiber by carrying out one or more chemical vapor deposition reactions in a substrate tube, with the optical fiber exhibiting a low sensitivity to the hydrogen-induced attenuation losses at a transmission wavelength of 1550 nm. The present invention furthermore relates to an optical fiber comprising a cladding layer and a light-conducting core, which fiber has been obtained by using the present method.

6 Claims, No Drawings

OPTICAL FIBER AND METHOD OF MANUFACTURING AN OPTICAL FIBER

CROSS-REFERENCE TO RELATED APPLICATIONS

This application is a divisional of U.S. patent application Ser. No. 10/165,620, filed Jun. 7, 2002, now pending, which claims the benefit of Netherlands Patent Application No. 1018239 filed Jun. 8, 2001, which applications are incorporated herein by reference in their entireties.

TECHNICAL FIELD

The present invention relates to a method of manufacturing an optical fiber by carrying out one or more chemical vapor deposition reactions in a substrate tube, with the optical fiber exhibiting a low sensitivity to the hydrogen-induced attenuation losses at a transmission wavelength of 1550 nm, which method comprises the following steps:

i) supplying one or more glass forming precursors, which may or may not be doped, to the substrate tube;

ii) supplying a stoichiometric excess amount of oxygen to the substrate tube;

iii) bringing about a reaction in the substrate tube between the reactants supplied in step i) and step ii) so as to deposit one or more layers of glass on the interior of the substrate tube;

iv) subjecting the substrate tube thus formed in step iii) to a collapsing treatment so as to form a preform; and finally v) drawing an optical fiber from the preform formed in step iv) while heating, and subsequently cooling the same.

The present invention furthermore relates to an optical fiber comprising a cladding layer and a light conducting core, which fiber has been obtained by using the present method.

BACKGROUND INFORMATION

Optical fibers of this type are generally known; they are mainly used in the field of telecommunication. Refer, for example, to European patent application No. 0 127 227, U.S. Pat. No. 5,242,476 and U.S. Pat. No. 5,838,866. Because of their characteristically low attenuation and dispersion, such optical fibers are in particular suitable for forming long-distance data links, which frequently bridge several thousand kilometers. When bridging such large distances, it is of major importance that the cumulative signal losses in the optical fiber be minimized if transmission of optical signals is to take place with a small number of intermediate amplification stations. With the transmission wavelength of 1550 nm that is generally used, it is a general requirement of the telecommunication industry that a total attenuation value in such optical fibers of 0.25 dB/km, preferable 0.2 dB/km, is not exceeded.

Although the fibers that are currently being manufactured are capable of meeting such requirements with regard to the allowable attenuation, it is nevertheless frequently observed that with the passage of time the same optical fibers exhibit significant increases as regards the attenuation that occurs therein. Extensive research has shown that this phenomenon can be attributed to the gradual ingress of hydrogen gas from the surrounding atmosphere into the fiber, resulting in the formation of groups such as SiH and SiOH within the fiber. These compounds exhibit a strong infrared absorption, with attenuation peaks at wavelengths of about 1530 and 1385 nm.

A solution for overcoming the problem of such hydrogen induced attenuation is known from European patent application No. 0 477 435. According to the method that is known therefrom, an optical fiber is extensively exposed to a hydrogen-containing gas during its manufacture, in order to ensure that all structural defects sites in the fiber are already provided with a hydrogen atom before actual implementation of the fiber takes place. One drawback of this known method, however, is the fact that it only tackles the symptoms of hydrogen-induced attenuation rather than the causes thereof. In addition, this known measure complicates the production process to a significant degree and introduces an additional risk of contamination of the fiber product by the hydrogen-containing gas that is used.

In addition to that, Dutch patent application NL 1015405 in the name of the present inventors, which has not been laid open to public inspection yet, discloses the possibility of preventing a significant increase of the hydrogen-induced attenuation at a wavelength of 1550 nm by building up the internal cladding of the optical fiber from $SiO_2$ doped with fluor in an amount of 0.1-8.5 wt. %, so the core is subjected to an axial compressive stress over the entire cross-section thereof, which axial compression suppresses the occurrence of defects.

BRIEF SUMMARY

In the present production process for manufacturing optical fibers, a preform is converted into a glass fiber having a diameter of about 125 micrometer while being heated. In order to further increase the efficiency of such glass fiber production processes, a trend can be observed in which the diameter of the preform is increased further and further, so that a greater length of glass fiber can be produced from such a preform. At the same time, the rate at which the optical glass fiber is drawn from the preform is increased, as a result of which the production per unit of time is increased.

The simultaneous increase of the preform diameter and the draw rate used in the drawing process may lead to an increase of the attenuation of the glass fiber after exposure to hydrogen at a transmission wavelength of 1550 nm, however. Such effects on the attenuation at a transmission wavelength of 1550 nm can be observed in particular with preforms having a diameter of more than 55 mm, in combination with the draw rate of more than 700 m/min.

As a result of the use of larger diameter preforms and the implementation of higher draw rates in the drawing process, the increased shearing forces caused by the larger diameter of the preform and the higher draw rate will lead to the formation of defects in the glass structure upon manufacture of the glass fiber. Such higher shearing forces may lead to more defects being formed, which has an adverse effect as regards the sensitivity to exposure to hydrogen after manufacture of the optical fiber.

The object of the present invention is thus to provide an optical fiber and a method of manufacturing the same, wherein the formation of defects in the glass structure, which defects are converted into so-called defect radicals under the influence of stress, which radicals will lead to an increase of the degree of attenuation in the glass fiber after exposure to hydrogen, is to be minimized.

Another object of the present invention is thus to provide an optical fiber and a method of manufacturing the same wherein the final glass structure of the glass fiber in the light conducting part thereof is substantially free from defects that cause the attenuation to increase.

Another object of the present invention is to provide an optical fiber, in which fiber the hydrogen-induced attenuation at a wavelength of 1550 nm is sufficiently low to ensure that the overall attenuation at that wavelength will be maximally 0.25 dB/km, preferably maximally 0.2 dB/km.

This objective is accomplished by the present invention as referred to in the introduction in that the present method of manufacturing an optical fiber is characterized in that the vapor deposition reaction in step iii) is carried out in such a manner that the amount of oxygen supplied to the substrate tube in step ii) is maximally 3.5 times the stoichiometric amount.

DETAILED DESCRIPTION

Although the manufacture of optical fibers in accordance with the preamble of the main claim is known from the article, "PCVD at high deposition rates," Geittner et al., Journal of Lightwave Technology 1t-4(7), July 1986, the stoichiometric excess amount of oxygen that is mentioned in said publication was maintained at a constant value of 4 during all experiments. Preforms with multiple step, step index, and graded index profiles have been prepared by depositing $SiO_2$ doped with $GeO_2$ and fluorine. To obtain such profiles $GeCl_4$ and $C_2F_6$ were used as gas phase dopants with concentrations $c_{DOPE}$ up to 12 mole % of the total chloride flow.

The present inventors have thus found that a reduction of the excess amount of oxygen in chemical vapor deposition will result in a significantly decreased occurrence of an increased attenuation level at 1550 nm after exposure to hydrogen if use is made of a preform having a diameter of at least 55 mm and a draw rate of at least 700 m/min. Although it is not exactly clear that factors cause such a favorable result, the present inventors assume that as a result of the reduction of the amount of oxygen supplied to the substrate tube to a value of maximally 3.5 times the stoichiometric amount, the chlorine concentration in the thus deposited glass will range between 500 and 3000 ppm, in particular between 1000 and 3000 ppm. It should be noted in this connection, however, that the present invention is by no means bound to such an explanation. The present inventors assume that the chlorine concentration in the glass fiber prevents Si-defects, which defects are formed during the vapor deposition reaction when using the present small excess amount of oxygen, leading to an undesirable increase in the attenuation level at 1550 nm, which increase will normally occur after exposure of the optical fiber to hydrogen gas, because SiH bonds are formed at these defect sites.

Furthermore, it is in particular preferable with the present invention to carry out the cooling process in step v) by cooling down the already drawn optical fiber at a temperature of at least 1000° C. for at least 0.08 seconds. The fact is that experiments have shown that the cooling range of the optical fiber has an effect on the hydrogen-induced attenuation increases at a transmission wavelength of 1550 nm, in which the cooling of the optical glass fiber under strict conditions, i.e., directly after it has reached the desired diameter, has a positive effect as regards the hydrogen-induced attenuation increase.

The present invention furthermore relates to an optical fiber comprising a cladding layer and a light-conducting core, which optical fiber is according to the present invention characterized in that it has been manufactured in accordance with a method as described above.

It is in particular preferable for the present optical fiber to have a chlorine content ranging between 500 and 3000 ppm, in particular between 1000 and 3000 ppm, in the light-conducting core thereof. If the amount of chlorine is higher than 3000 ppm, there is a great risk of chlorine bubbles being formed in the deposited glass, which is undesirable in practice. If, on the other hand, the chlorine content is less than 500 ppm, no positive effect can be detected as regards the aim of making the optical fiber less sensitive to hydrogen-induced attenuation losses at 1550 nm.

It is in particular preferable to keep the total attenuation losses, including the hydrogen-induced attenuation losses at 1550 nm, below a maximum level of 0.25 dB/km.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical fiber comprising a cladding layer and a light conducting core, wherein the optical fiber is manufactured by:
   i) supplying one or more glass forming precursors to a substrate tube;
   ii) supplying a stoichiometrically excess amount of oxygen to the substrate tube;
   iii) bringing about a reaction in the substrate tube between reactants supplied in i) and ii) so as to deposit one or more layers of glass on an interior of the substrate tube;
   iv) subjecting the substrate tube thus formed in iii) to a collapsing treatment so as to form a preform; and
   v) drawing an optical fiber from the preform formed in iv) while heating, and subsequently cooling same, wherein vapor deposition reaction in iii) is carried out in such a manner that the amount of oxygen supplied to the substrate tube in ii) is maximally 3.5 times a stoichiometric amount,
   wherein the light conducting core is doped with $GeO_2$ and fluorine and an amount of Cl in the light conducting core ranges between 500 and 3000 ppm, and
   wherein a total attenuation of light transmission at 1550 nm, including hydrogen-induced attenuation, is maximally 0.25 dB/km.

2. The optical fiber of claim 1 wherein an amount of Cl in the light conducting core ranges between 1000 and 3000 ppm.

3. An optical fiber comprising a cladding layer and a light conducting core, wherein the optical fiber is manufactured by:
   i) supplying one or more glass forming precursors, which may or may not be doped, to the substrate tube;
   ii) supplying a stoichiometrically excess amount of oxygen to the substrate tube;
   iii) bringing about a reaction in the substrate tube between reactants supplied in i) and ii) so as to deposit one or more layers of glass on an interior of the substrate tube;
   iv) subjecting the substrate tube thus formed in iii) to a collapsing treatment so as to form a preform; and
   v) drawing an optical fiber from the preform formed in iv) while heating, and subsequently cooling same, wherein vapor deposition reaction in iii) is carried out in such a manner that the amount of oxygen supplied to the substrate tube in ii) is maximally 3.5 times a stoichiometric amount, and wherein the cooling in v) is carried out by cooling down the drawn optical fiber at a temperature of at least 1000° C for at least 0.08 seconds,
wherein the light conducting core is doped with $GeO_2$ and fluorine and an amount of Cl in the light conducting core ranges between 500 and 3000 ppm, and
wherein a total attenuation of light transmission at 1550 nm, including hydrogen induced attenuation, is maximally 0.25 dB/km.

4. The optical fiber of claim 3 wherein an amount of Cl in the light conducting core ranges between 1000 and 3000 ppm.

5. An optical fiber comprising a light conducting core and a cladding layer, wherein the light conducting core is doped with $GeO_2$ and fluorine and an amount of Cl in the light conducting core ranges between 500 and 3000 ppm and wherein a total attenuation of light transmission at 1550 nm, including hydrogen induced attenuation, is maximally 0.25 dB/km.

6. The optical fiber of claim 5 wherein the amount of Cl in the light conducting core ranges between 1000 and 3000 ppm.

* * * * *